3,079,307
PROCESS FOR THE ENZYMATIC ACYLATION OF 6-AMINOPENICILLANIC ACID

Wilfried Kaufmann, Wuppertal-Vohwinkel, and Klaus Bauer, Wuppertal-Elberfeld, Germany, assignors to Farbenfabriken Bayer Aktiengesellschaft, Leverkusen, Germany, a corporation of Germany
No Drawing. Filed Sept. 18, 1962, Ser. No. 224,530
Claims priority, application Germany Oct. 7, 1961
3 Claims. (Cl. 195—36)

The present invention relates to a process for the enzymatic acylation of 6-aminopenicillanic acid and more particularly to the enzymatic synthesis of α-aminobenzyl penicillin (Ampicillin).

α-Aminobenzyl penicillin has heretofore been described as having been produced by the chemical linkage of α-aminophenyl acetic acid with 6-aminopenicillanic acid. This process can be carried out by the known methods of peptide chemistry. However, the process involves considerable difficulties. The procedure is such that the primary amino group in the α-aminophenyl acetic acid is protected by acylation with, for example, chloroformic acid benzyl ester, the carbobenzoxy-α-phenyl glycine converted into a reactive mixed acid anhydride and this allowed to react with 6-aminopenicillanic acid. An acid amide linkage of the carboxyl group of the carbobenzoxy-α-aminophenyl acetic acid with the 6-positioned amino group of the 6-aminopenicillanic acid is formed thereby. As the final step of the synthesis, the carbobenzoxy residue must be split off by catalytic hydrogenation.

In copending United States application Serial No. 54,837 which was filed on September 9, 1960, we have described a process for the production of 6-acylamino penicillanic acids that comprises cultivating in a nutrient medium under aerobic conditions at an approximately neutral pH, a culture of bacteria selected from the group of bacteria capable of preferentially attacking the amide bond in the 6-position of a penicillin molecule with the formation of 6-aminopenicillanic acid as evidenced by the ability to inactivate penicillin G by at least 20 percent within 24 hours to yield a solution in which said inactivated penicillin G can be at least partially re-synthesized by the addition of phenylacetyl chloride thereto; separating the bacterial cells from the culture solution and suspending said cells in an aqueous medium; adding thereto 6-aminopenicillanic acid and a carboxylic acid derivative containing an acyl radical of the general formula R—$(X)_n$—$CH_2$—CO, wherein R is a member selected from the group consisting of lower alkyl radicals containing from 1 to 7 carbon atoms, and phenyl radicals; X is a member selected from the group consisting of oxygen and sulfur; and $n$ is an integer of from 0 to 1, inclusive; said bacterial cells functioning to link the 6-amino group of said 6-aminopenicillanic acid with said acyl radical; adjusting the pH value to between 4.0 and 5.5; incubating the resulting reaction mixture for at least two hours; and thereafter recovering the 6-acylaminopenicillanic acid from the reaction mixture.

It is an object of the invention to provide a process by which α-aminobenzyl penicillin may be obtained more easily and in better yields than is possible by applying the methods of peptide chemistry.

A further object is the provision of a process for making α-aminobenzyl penicillin from 6-aminopenicillanic acid by enzymatic acylation.

Still further objects will become apparent as the following specification proceeds.

We have found that these objects are accomplished by linking 6-aminopenicillanic acid enzymatically with derivatives of α-aminophenyl acetic acid, especially its esters and amides like α-phenylglycyl amide or α-phenylglycine ethyl ester. The process is carried out by cultivating in a nutrient medium under aerobic conditions at an approximately neutral pH a culture of a penicillin splitting bacterium, separating the bacterial cells from the culture solution and suspending said cells in an aqueous medium, adding thereto 6-aminopenicillanic acid and a derivative of α-aminophenyl acetic acid selected from the group consisting of α-phenylglycyl amide and α-phenylglycine ethyl ester. The bacterial cells function to link the 6-amino group of the 6-aminopenicillanic acid with the α-aminophenyl acetyl radical.

During the reaction the pH value is adjusted to a pH of between 4.5 to 8, preferably to a pH of about 6. The α-aminobenzyl penicillin obtained after an incubation time of at least 1 hour at a temperature of about 37° C. is recovered by the methods known in the art. The penicillin splitting bacteria employed for the enzymatic acylation are selected from the group of bacteria capable of preferentially attacking the amide bond in the 6-position of a penicillin molecule with the formation of 6-aminopenicillanic acid as evidenced by the ability to inactivate penicillin G by at least 20 percent within 24 hours to yield a solution in which said inactivated penicillin G can be at least partially re-activated by the addition of phenylacetyl chloride thereto.

In particular the bacteria suitable for the present invention belong to the class of Schizomycetes. Suitable bacteria which can be employed in the same manner as described in the following examples for *Escherichia coli* are *Alcaligenes faecalis*, *Aerobacter aerogenes*, *Proteus rettgeri*, Proteus OX 19, Salmonella, *Micrococcus roseus* and Arthrobacter.

For the purpose of the invention the 6-aminopenicillanic acid may be employed in the form of its crude solutions which are obtained by the action of suspensions or extracts of those penicillin-splitting bacteria which preferably attack the amide bond in the 6-position of the penicillin molecule or of enzymes or enzyme extracts obtained therefrom on penicillins.

The α-aminobenzyl penicillin is of especial practical significance because, in contradistinction to penicillin G, it possesses a strong antibacterial action against a series of gram-negative bacteria.

Example 1

160 litres of 2% by volume corn steep liquor, containing 0.2% of potassium phenyl acetate, are adjusted to pH 7.0 with KOH and heated for 30 minutes to 120° C. After cooling, the solution is clarified by centrifuging and sterilized for 40 minutes at 110° C. in the fermenter. This nutrient solution is, after cooling, inoculated with 400 cc. of an 18 hour shake culture of *Escherichia coli* ATCC 11 105. The reaction mixture is then aerated with 150 litres of air per minute at 150 revolutions of the stirrer per minute and cultivated for 17 hours at 31° C. without excess pressure. During the whole period of growth, 5 litres of carbon dioxide per minute are passed into the culture through a pipe separate from the air pipe of the fermenter.

The bacteria cells are centrifuged off from the culture solution, washed in 16 litres of a 0.9% NaCl solution and, after renewed centrifuging off, resuspended in $\frac{1}{15}$ M phosphate buffer solution at pH 6.0. To this suspension there are added 0.125% of 6-aminopenicillanic acid, 1% of α-phenylglycyl amide and 0.2% of toluene. The reaction mixture is then adjusted to pH 6.0 with NaOH and maintained for 1 hour at 37° C. By the enzymic reaction, there result 509 units of α-aminobenzyl penicillin per cc. of reaction mixture.

Example 2

160 litres of 2% by volume corn steep liquor, containing 0.2% of potassium phenyl acetate, are adjusted to pH 7.0 with KOH and heated for 30 minutes at 120° C. After cooling, the solution is clarified by centrifuging and sterilized in the fermenter for 40 minutes at 110° C. This nutrient solution is, after cooling, inoculated with 400 cc. of an 18-hour-shake culture of *Escherichia coli* ATCC 11 105. The reaction mixture is then aerated with 150 litres of air per minute at 150 revolutions of the stirrer per minute and cultivated for 17 hours at 31° C. without excess pressure. During the whole period of growth, 5 litres of carbon dioxide per minute are passed into the culture through a pipe separate from the air pipe of the fermenter.

The bacteria cells are centrifuged off from the culture solution, washed in 16 litres of 0.9% NaCl solution and, after renewed centrifuging off, resuspended in 1/15 M phosphate buffer solution at pH 6.0. To this suspension there are added 0.125% of 6-aminopenicillanic acid, 1.0% of α-phenylglycine ethyl ester hydrochloride and 0.2% of toluene. The reaction mixture is then adjusted to pH 6.0 with NaOH and maintained for 1 hour at 37° C. By the enzymic reaction, there result 625 units of α-aminobenzyl penicillin per cc. of reaction mixture.

We claim:

1. Process for the production of α-aminobenzyl penicillin which comprises cultivating in a nutrient medium under aerobic conditions at an approximately neutral pH a culture of penicillin splitting bacteria, separating the bacterial cells from the culture solution and suspending said cells in an aqueous medium, adding thereto 6-aminopenicillanic acid and a derivative of α-aminophenyl acetic acid selected from the group consisting of α-phenyl glycyl amide and α-phenyl glycine ethyl ester, said bacterial cells functioning to link the 6-amino group of said 6-aminopenicillanic acid with the α-aminophenyl acetyl radical, adjusting the pH to between about 4.5 and 8 and incubating the resulting reaction mixture for at least one hour, said penicillin-splitting bacteria being selected from the group of bacteria capable of preferentially attacking the amide bond in the 6-position of a penicillin molecule with the formation of 6-aminopenicillanic acid as evidenced by the ability of said bacteria to inactivate penicillin G by at least 20 percent within 24 hours to yield a solution in which said inactivated penicillin G can be at least partially reactivated by the addition of phenylacetyl chloride thereto.

2. Process for the production of α-aminobenzyl penicillin which comprises cultivating in a nutrient medium under aerobic conditions at an approximately neutral pH a culture of *Escherichia coli*, separating the bacterial cells from the culture solution and suspending said cells in an aqueous medium, adding thereto 6-aminopenicillanic acid and a derivative of α-aminophenyl acetic acid selected from the group consisting of α-phenyl glycyl amide and α-phenyl glycine ethyl ester, said bacterial cells functioning to link the 6-amino group of said 6-aminopenicillanic acid with the α-aminophenyl acetyl radical, adjusting the pH to between about 4.5 and 8 and incubating the resulting reaction mixture for at least one hour.

3. Process for the production of α-aminobenzyl penicillin which comprises cultivating in a nutrient medium under aerobic conditions at an approximately neutral pH a culture of *Escherichia coli*, separating the bacterial cells from the culture solution and suspending said cells in an aqueous medium, adding thereto 6-aminopenicillanic acid and a derivative of α-aminophenyl acetic acid selected from the group consisting of α-phenyl glycyl amide and α-phenyl glycine ethyl ester, said bacterial cells functioning to link the 6-amino group of said 6-aminopenicillanic acid with the α-aminophenyl acetyl radical, adjusting the pH to 6 and incubating the resulting reaction mixture for at least one hour.

References Cited in the file of this patent

UNITED STATES PATENTS 3,047,467    Doyle et al. _____ July 31, 1962